(No Model.)
P. W. DOHERTY.
SOIL OR DRAIN PIPE.
No. 263,494. Patented Aug. 29, 1882.
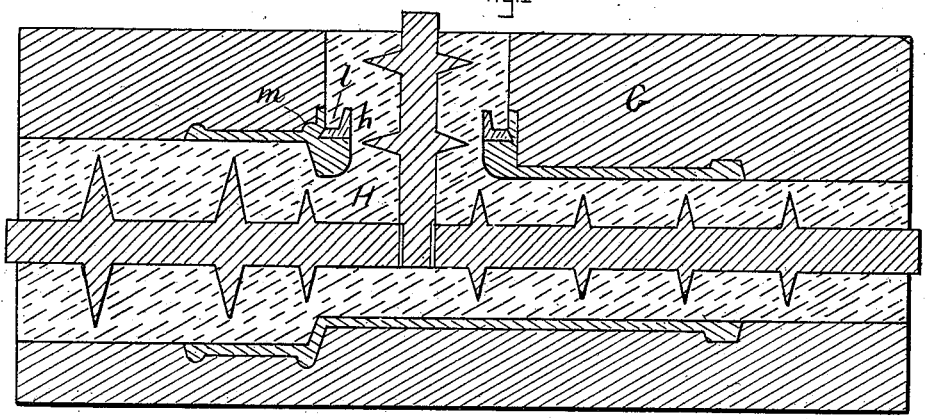
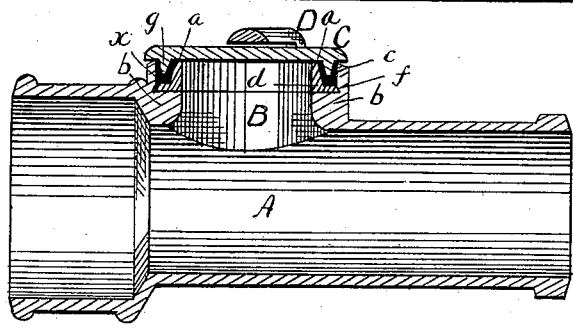
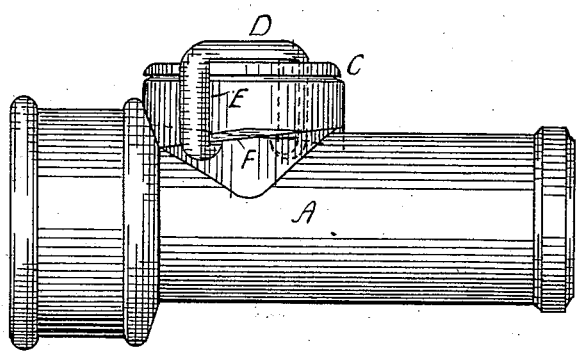
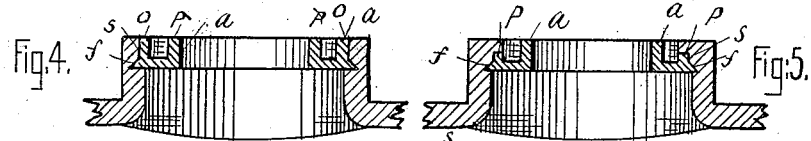
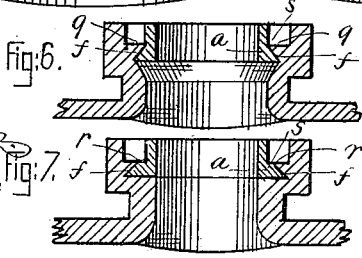
Witnesses:
P. W. Doherty,
Inventor
per Brown Bros.
Attorneys

UNITED STATES PATENT OFFICE.

PATRICK W. DOHERTY, OF BOSTON, MASSACHUSETTS.

SOIL OR DRAIN PIPE.

SPECIFICATION forming part of Letters Patent No. 263,494, dated August 29, 1882.

Application filed December 12, 1881. (No model.)

*To all whom it may concern:*

Be it known that I, PATRICK W. DOHERTY, of Boston, in the county of Suffolk and State of Massachusetts, have invented certain new and useful Improvements in Soil or Drain Pipes, &c., of which the following is a full, clear, and exact description.

In the pipes and traps of various kinds used in the water and drainage systems of dwelling-houses and other buildings hand-holes are provided at various points through which to enter them to clean them from time to time. These hand-holes are closed with a cover or plug, which is adapted to be removed and replaced at pleasure, and is intended to be sealed at its joint with the pipe or trap against leakage of gases, &c. It is to the formation of these hand-holes to be so sealed that this invention particularly pertains; and to that end it consists of a groove or channel which is at and about the mouth of the hand-hole, and has its inner wall composed of a ring of metal made separately from the pipe, &c., and secured to the pipe by molding the pipe or trap to or about said ring in a manner to leave the channel described and at the same time rigidly secure the ring against displacement or accidental removal, all substantially as hereinafter described.
This invention in one form is fully illustrated in the accompanying plate of drawings, in which—

Figure 1 is a central longitudinal section of of a pipe, mold-box, and sand-core, showing the pipe as molded therein and at and about a flanged ring, which ring interiorly, together with a hole in the side of the pipe, makes the hand-hole of the pipe. Fig. 2 is a central longitudinal section of the pipe removed from the mold shown in Fig. 1, and having its hand-hole closed by a cover. Fig. 3 is a side view of the pipe and cover; Figs. 4, 5, 6, and 7, sectional views in detail, showing modifications, as will hereinafter appear.
In the drawings, A represents a soil-pipe, made of cast-iron, and, except as to this invention, the same as the common cast-iron soil-pipes.

B is a hand-hole in one side of the pipe.
This hand-hole is formed at its outer end of a metallic ring, *a*. The ring makes the inner wall, and the pipe, as it is shown in Fig. 2, in its part *b*, makes the outer wall of a groove or channel, *c*, which surrounds the hand-hole, and has its bottom wall within the pipe and formed (see Fig. 2) of a flange, *d*, to the ring. The outer edge, *f*, of the flange is beveled, and it enters into the metal composing the pipe, and thus the ring is made secure against escape outwardly from and also against a lateral movement within the opening of the pipe embraced within the inner periphery of the outer wall of the channel. The ring is held against a movement inwardly by the interlock (above described) of the ring-flange with the pipe, and also, as shown by the formation of the pipe, against the under and inner side of the ring-flange, as at *b*, Fig. 2; but obviously this portion of the pipe may be dispensed with, either in whole or in part, and again it may be made of various shapes, and, in any event, with an interlock such as described, the fixture of the ring is secured as to any movement inwardly.

The channel *c* and hand-hole B are closed by a cover or lid, C, adapted to be fastened in such position to the pipe in any of the well-known modes—as, for instance, by a stirrup-shaped strap, D, crossing and resting upon the cover, and by its legs E, engaged with wedge or screw-shaped lugs F, surrounding the outside of that portion of the pipe having the hand-hole, as described.

As shown, a lip, *g*, of the cover enters the groove *c* about the hand-hole when the cover is in place, as described, and this lip, if used, is shaped to leave a space between it and the several walls of the groove to be filled by the packing used, and which packing, before attaching the cover to the pipe, as described, is to be placed in sufficient quantity in the groove, and is to be of a material capable of compression under the aforesaid attachment of the cover—as, for instance, a mixture of putty and red lead, Portland or other cements, &c. With the groove *c* thus packed the joint at the cover and hand-hole is sealed in a most perfect and reliable manner against the escape of gases, &c.

The pipe, with a hand-hole and a groove or channel, *c*, formed about it, having its inner wall made of the ring *a* and otherwise formed as has been described, is made in a mold-box, G, having a sand-core, H, (see Fig. 1,) each shaped as usual for the casting of the pipe, with a hand-hole through one side. Under this invention, however, this hole is continued by the metallic ring $a$, which is arranged upon the core, suitably shaped, as at $h$, Fig. 1, to receive it, and the part $b$ of the pipe, forming, as to the pipe, the hand-hole, to be molded or cast against the inner face and about the beveled edge of its flange, and thus the ring is secured to the pipe. The core is also shaped at $l$, Fig. 1, and the mold-box at $m$, Fig. 1, to leave in the casting of the pipe, as above, because of the core part $l$, the groove or channel $c$, described, and because of the shape of the mold-box secure the outer wall, $n$, to said groove. In this casting of the pipe the hand-hole and channel are obtained, and the ring is attached to the pipe so as to be secure against lateral movement, and also against accidental outward and inward displacement or escape from its proper position, and all in a most economical and simple manner, and one in which the formation of the packing-groove is positively insured, for the reason that the part of the core which, with the ring and pipe, secures the channel is sustained and protected in such position for the such formation of the channel, from the fact that it has from the ring a rigid internal support, as is apparent without further explanation.

As herein specially described and shown in the drawings which have been referred to, the outer wall of the groove is made of the pipe itself and the bottom wall of the flange to the ring. The ring, however, itself may be formed to make either the whole or a part of the outer wall of the groove—as, for instance, as shown at $o$ and $p$, Figs. 4 and 5, respectively; and, again, the bottom wall may be of the pipe, either in whole or in part, (see Figs. 6 and 7 at $q$ and $r$, respectively.)

An interlock between the ring $a$ and the pipe—as, for instance, such as shown at $x$, Fig. 2, and at $s$ in Figs. 4, 5, 6, and 7 in the modifications described—is essential for the purposes stated; but it is plain that such interlock may be secured in various ways too well known to require particular mention herein.

Although this invention has been particularly described as to pipes, it is obviously applicable to stench and other traps which in use act as passages or conduits for fluids, &c., the same as pipes, and therefore it is intended in all cases in this specification to include in the term "pipes" stench and other traps.

I do not wish to be understood as broadly claiming a soil or other pipe provided with a hand-hole having at its mouth a groove or channel and a metal ring, as such is in my Letters Patent No. 239,741; but the ring therein is loose and independent of the pipe itself, and is so made for the purpose of bearing at its lower edge on a packing supported by a shoulder on the pipe.

In my present invention the ring is made separate from the pipe and the latter is cast upon it, thereby making the ring a fixture of the pipe. This provides the desired groove or channel to receive the lip on the cover to the hand-hole, and also avoids the possibility of the ring becoming disarranged or accidentally lost from its proper position, while the manufacture of the pipe in the manner herein described is rendered simple and the cost of production considerably lessened, while a better and more desirable article is furnished to the trade.

I am aware that it is not broadly new to secure a ring in place by casting metal about the ring—as, for example, in casting a valve-seat or a ring in the casing of a valve or steam-governor; but where this is done, however, the ring does not constitute the inner wall to a groove or channel for receiving the annular lip on a cover for the hand-hole of a soil or drain pipe.

Having thus described my invention, what I claim, and desire to secure by Letters Patent, is—

As an improved article of manufacture, a soil or drain pipe provided with a hand-hole having a surrounding groove or channel the inner wall of which is formed by a ring rigidly and permanently secured in the mouth of the hand-hole, substantially as shown and described.

In testimony whereof I have hereunto set my hand in the presence of two subscribing witnesses.

PATRICK W. DOHERTY.

Witnesses:
EDWIN W. BROWN,
WM. S. BELLOWS.